(12) United States Patent
Shioiri et al.

(10) Patent No.: US 8,639,114 B2
(45) Date of Patent: Jan. 28, 2014

(54) DPSK MODULATION-DEMODULATION METHOD, AND OPTICAL COMMUNICATION DEVICE AND OPTICAL COMMUNICATION SYSTEM USING THE SAME

(75) Inventors: Satomi Shioiri, Tokyo (JP); Toshiharu Itou, Tokyo (JP); Kiyoshi Fukuchi, Tokyo (JP); Hitoshi Takeshita, Tokyo (JP)

(73) Assignee: NEC Corporation, Tokyo (JP)

( * ) Notice: Subject to any disclaimer, the term of this patent is extended or adjusted under 35 U.S.C. 154(b) by 1170 days.

(21) Appl. No.: 11/916,612

(22) PCT Filed: Jun. 28, 2006

(86) PCT No.: PCT/JP2006/313353
§ 371 (c)(1),
(2), (4) Date: Dec. 5, 2007

(87) PCT Pub. No.: WO2007/001090
PCT Pub. Date: Jan. 4, 2007

(65) Prior Publication Data
US 2008/0232815 A1 Sep. 25, 2008

(51) Int. Cl.
*H04J 14/02* (2006.01)
*H04J 14/08* (2006.01)
(52) U.S. Cl.
CPC .................................... *H04J 14/08* (2013.01)
USPC .............................................. 398/47; 398/75
(58) Field of Classification Search
USPC ............................................. 398/140, 47, 75
See application file for complete search history.

(56) References Cited

U.S. PATENT DOCUMENTS

| | | | | |
|---|---|---|---|---|
| 5,339,183 | A * | 8/1994 | Suzuki | 398/75 |
| 6,175,320 | B1 * | 1/2001 | Heflinger | 341/137 |
| 6,271,950 | B1 * | 8/2001 | Hansen et al. | 398/154 |
| 6,934,308 | B1 * | 8/2005 | Yonenaga et al. | 370/535 |
| 7,233,430 | B2 * | 6/2007 | Caplan | 359/325 |

FOREIGN PATENT DOCUMENTS

| | | |
|---|---|---|
| EP | 1026863 A2 | 8/2000 |
| EP | 1513273 A2 | 3/2005 |
| JP | 11-122205 A | 4/1999 |

(Continued)

OTHER PUBLICATIONS

Christian Rasmussen et al., DWDM40G Transmission Over Trans-Pacific Distance (10000km) Using CSRZ-DPSK, Enhanced FEC, and All-Raman-Amplified 100-km Ultra Wave Fiber Spans, Journal of Lightwave Technology, U.S.A., Jan. 2004, vol. 22, No. 4, pp. 203-207.

*Primary Examiner* — Danny Leung
(74) *Attorney, Agent, or Firm* — Sughrue Mion, PLLC

(57) ABSTRACT

In the optical communication device and the optical communication system using DPSK modulation whose cost is low, whose size is small and whose power consumption is low, the N:1 multiplexer 125 generates a serial signal by multiplexing a parallel signal coded by the DPSK modulation coding units 115~117 bit by bit on a time division basis. The electric-phase modulation optical converter 127 converts a serial signal into a phase modulation light. The N-bit delay interferometer 132 executes DPSK decoding with respect to a phase modulation light by comparison with an N-bit preceding optical signal. The optical-electric signal converter 134 converts a decoded intensity modulation light into an electric signal. The N:1 demultiplexer 136 divides an electric signal converted by the optical-electric signal converter 134 into a number N of signals bit by bit on a time division basis.

19 Claims, 15 Drawing Sheets

(56) References Cited

FOREIGN PATENT DOCUMENTS

| | | |
|---|---|---|
| JP | 2000-224244 A | 8/2000 |
| JP | 2003-501696 A | 1/2003 |
| JP | 2005-080304 A | 3/2005 |
| JP | 2005-110266 A | 4/2005 |
| JP | 2005-237010 A | 9/2005 |

* cited by examiner

DPSK MODULATION-DEMODULATION METHOD, AND OPTICAL COMMUNICATION DEVICE AND OPTICAL COMMUNICATION SYSTEM USING THE SAME

TECHNICAL FIELD

The present invention relates to a DPSK (Differential Phase Shift Keying) modulation-demodulation method, an optical communication device and an optical communication system and, more particularly, to a DPSK modulation-demodulation method for applying a DPSK modulation-demodulation method to a super-high speed optical communication system at low costs, and an optical communication device and an optical communication system using the same.

BACKGROUND ART

As a modulation-demodulation method used in an optical communication system, a DPSK modulation-demodulation method is a communication method excellent in reception sensitivity. Accordingly, it is in particular expected for use in a long-distance optical communication system (see e.g. Literature 2).

Structure and operation of a common optical communication system using a DPSK modulation-demodulation method will be described with reference to FIG. 14 and FIG. 15. The optical communication system shown in FIG. 14 includes a transmission device 1301 for sending out a super-high speed optical signal of R (R: the number on the order of G (gigabit)) bps (bit per second), a reception device 1302 for receiving an Rbps optical signal transmitted over a long distance and an optical fiber 103 for transmitting an optical signal between these devices.

The transmission device 1301 comprises an N:1 multiplexer 1141, a DPSK modulation coding unit 1322 for receiving input of an Rbps multiplexing signal 1321 from the N:1 multiplexer 1141 to execute coding, and an electric-to-optical signal converter (electric-phase modulation optical signal converter) 1143. The reception device 1302 comprises an Rbps 1-bit delay interferometer 1332, an optical-electric signal converter 1334 and a 1:4 demultiplexer 1336.

FIG. 15 is a timing chart showing one example of an input/output signal string in the optical communication system shown in FIG. 14. The N:1 multiplexer 1141, with a number N of R/N bps signals D1~DN synchronizing with each other as an input, multiplexes the signals bit by bit to output an Rbps output signal D. The DPSK modulation coding unit 1322, with the output signal D of the N:1 multiplexer 1141 as an input, executes coding for DPSK modulation to output a coded Rbps signal (electric signal) F. The electric signal-phase modulation optical signal converter 1143, with the Rbps electric signal F as an input, outputs an Rbps optical signal Q having phase information. In FIG. 15, Dij, Fij and D'ij represent j-th signals (indicative of data) in signals Di (i=1, 2, . . . , N), Fi and D'i.

The 1-bit delay interferometer 1332, with an Rbps phase modulation optical signal Q' which has been transmitted through the optical fiber 103 as an input, detects a phase difference with a one-bit preceding signal to output an intensity modulation optical signal F' corresponding to the phase deference. The optical-electric signal converter 1334, with the Rbps intensity modulation optical signal F' as an input, outputs an Rbps electric signal D'.

Disclosed in Literature 1 is a method, related to duobinary modulation, of coding each of a number N of low-speed signals on the transmission side to multiplex the obtained signals on a time division basis after coding. The literature fails to recite a DPSK demodulation method on the reception side.

Literature 1: Japanese Patent Laying-Open No. 11-122205 (FIG. 1, paragraphs 0033~0038, paragraph 0058).

Literature 2: Christian Rasmussen et al., DWDM40G Transmission Over Trans-Pacific Distance (10000 km) Using CSRZ-DPSK, Enhanced FEC, and All-Raman-Amplified 100-km Ultra Wave Fiber Spans, Journal of Lightwave Technology, U.S.A., January 2004, vol. 22, No. 4, pp. 203-207.

Optical communication systems in related art using a DPSK modulation-demodulation method have the following problems.

First problem is that a DPSK modulation-demodulation method makes a transmission device a high cost device requiring large power consumption. The reason is that a DPSK modulation coding unit operable at a super-high speed which is used in DPSK modulation is designed to flow a large amount of current to a transistor so as to bring out the best of performance by using high-cost advanced semiconductor process technology. In particular, application of a DPSK modulation coding unit operable at a super-high speed is directed to long-distance transmission for which mass production is not expected, so that cost-down by mass production effect is not expected either.

Second problem is that a system structure is not suitable for down-sizing of a device. The reason is that in the structure shown in FIG. 14, for example, a super-high speed signal is handled as an input/output signal of the DPSK modulation coding unit 1322. The super-high speed signal requires a high-quality connector for connection and a cable for connection in order to prevent signal quality degradation from causing a signal error. Therefore, space is required for layout to hinder compact packaging.

Third problem is that with the structure shown in FIG. 14, for example, co-existence of systems whose speeds are different makes the entire device expensive. The reason is that when a 10 Gbps system and a 40 Gbps system coexist, for example, a coding unit required for DPSK modulation-demodulation can not be commonly used and a 1-bit delay unit can not be shared for 10 Gbps and 40 Gbps either and they need to be prepared for 10 Gbps and 40 Gbps separately.

Under these circumstances, an object of the present invention is to provide low-cost and small-sized optical communication device and optical communication system using DPSK modulation requiring low power consumption.

Another object of the present invention is to facilitate improvement in speed from a 10 Gbps system to a 40 Gbps system and provide an optical communication device and an optical communication system whose costs are low and whose sizes are small as a whole even when systems with two speeds coexist.

SUMMARY

An exemplary aspect of the invention, an optical communication device for use in an optical communication system which uses a DPSK modulation-demodulation method, includes a coding unit for executing DPSK modulation coding with respect to input electric signals in N (N: positive integer) parallel, a multiplexing unit for multiplexing a parallel signal coded by the coding unit bit by bit on a time division basis to generate a serial signal, an electric-phase modulation optical signal conversion unit for converting a serial signal generated by the multiplexing unit into a phase modulation optical signal, a decoding unit for executing DPSK decoding of the phase modulation optical signal by comparison with an N-bit preceding optical signal, an optical-electric signal conversion unit for converting an intensity modulation optical signal decoded by the decoding unit into an electric signal, and a division unit for dividing an electric signal converted by the optical-electric signal conversion unit into the number N of signals bit by bit on a time division basis.

EFFECT OF THE INVENTION

First effect of the present invention is to reduce costs of super-high speed optical communication device and optical communication system using DPSK modulation-demodulation.

Second effect is reduction in power consumption of super-high speed optical communication device and optical communication system using DPSK modulation.

EXEMPLARY EMBODIMENT

First Exemplary Embodiment

Next, exemplary embodiments of the present invention will be described in detail with reference to the drawings.

Figure 1:
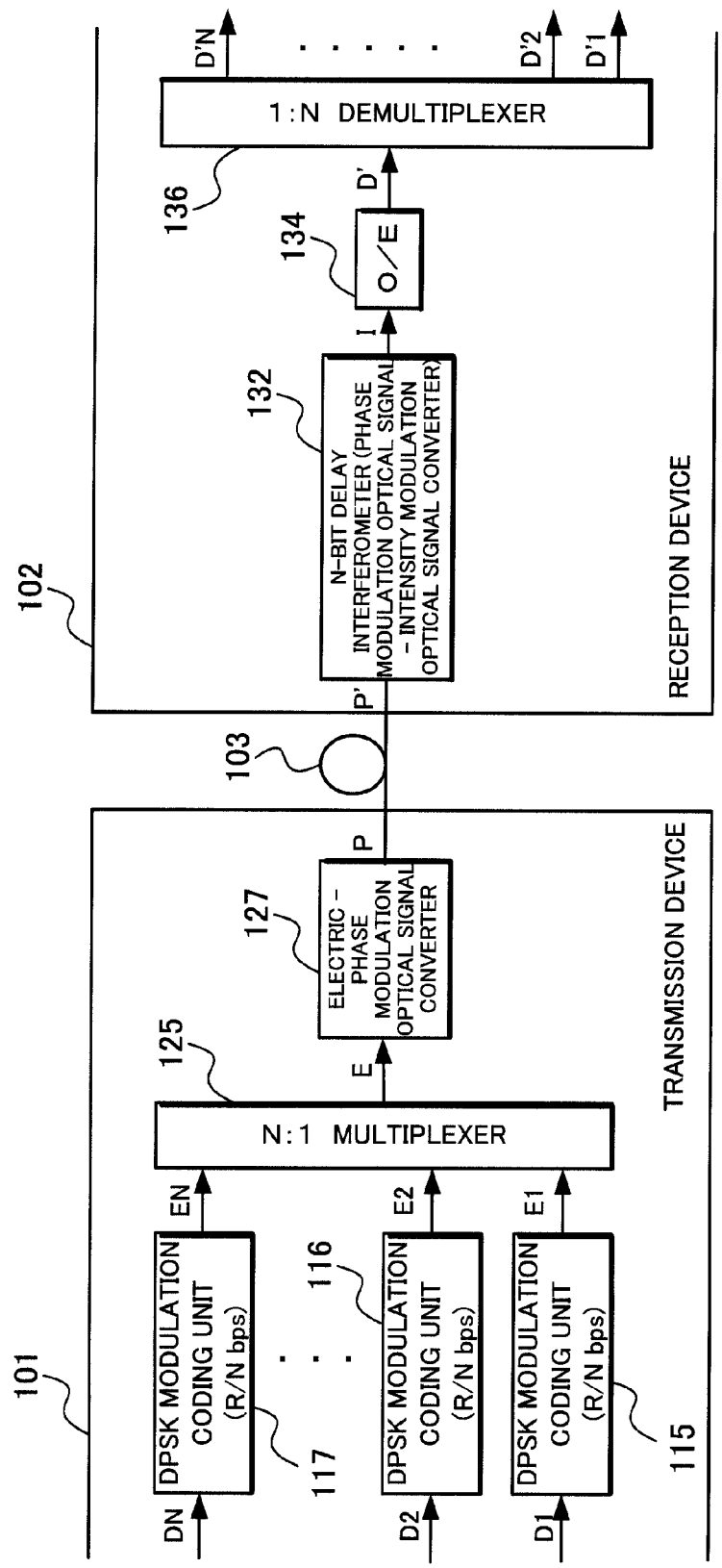
FIG. 1 is a block diagram showing a structure of a first exemplary embodiment according to the present invention.

FIG. 1 is a block diagram showing a first exemplary embodiment of an optical communication system according to the present invention. As shown in FIG. 1, the optical communication system according to the first exemplary embodiment includes a transmission device 101 for sending out a phase modulation optical signal at a rate of Rbps, a reception device 102 for receiving an Rbps phase modulation optical signal transmitted over a long distance and an optical fiber 103 for transmitting an optical signal.

The transmission device 101 comprises a number N (N is a positive integer) of DPSK modulation coding units 115~117, an N:1 multiplexer 125 and an electric-phase modulation optical signal converter 127. The reception device 102 comprises an N-bit delay interferometer 132 as a phase modulation optical signal—intensity modulation optical signal converter, an optical-electric signal converter 134 for converting light intensity to electricity and an N:1 demultiplexer 136.

The number N of DPSK modulation coding units 115~117 receive input of signals D1~DN whose rate is R/Nbps to output R/Nbps signals E1~EN coded, respectively. The N:1 multiplexer 125, with the number N of R/Nbps signals E1~En output from the DPSK modulation coding units 115~117 as an input, multiplexes these signals bit by bit on a time division basis to generate and output an electric signal E as one Rbps serial signal. The electric-phase modulation optical signal converter 127 converts the Rbps electric signal E output from the N:1 multiplexer 125 into an Rbps phase modulation optical signal P and outputs the obtained signal.

The N-bit delay interferometer 132, with an Rbps phase modulation optical signal P' as an input, detects a phase difference from an N-bit (more specifically, time period equivalent to N bits) preceding optical signal to output an intensity modulation optical signal I according to the phase difference. The optical-electric signal converter 134, with the Rbps intensity modulation optical signal I output from the N-bit delay interferometer 132 as an input, outputs an Rbps electric signal D' corresponding to signal light intensity. The N:1 demultiplexer 136 separates signals D'1~D'2 from the electric signal D'. In other words, an electric signal converted by the optical-electric signal converter 134 is divided bit by bit on a time division basis into the number N of signals.

Figure 2:
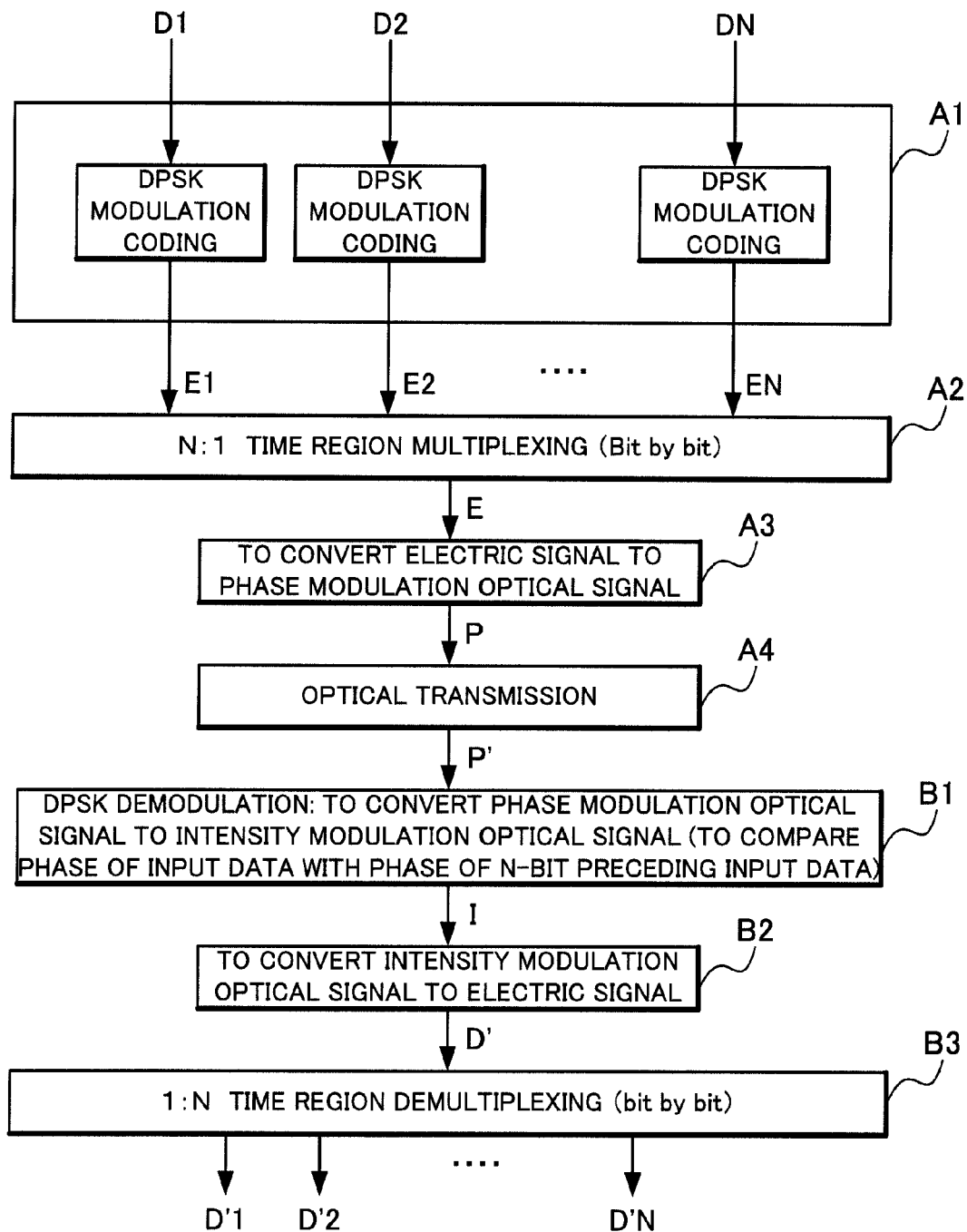
FIG. 2 is a flow chart showing operation of the first exemplary embodiment.
Figure 3:
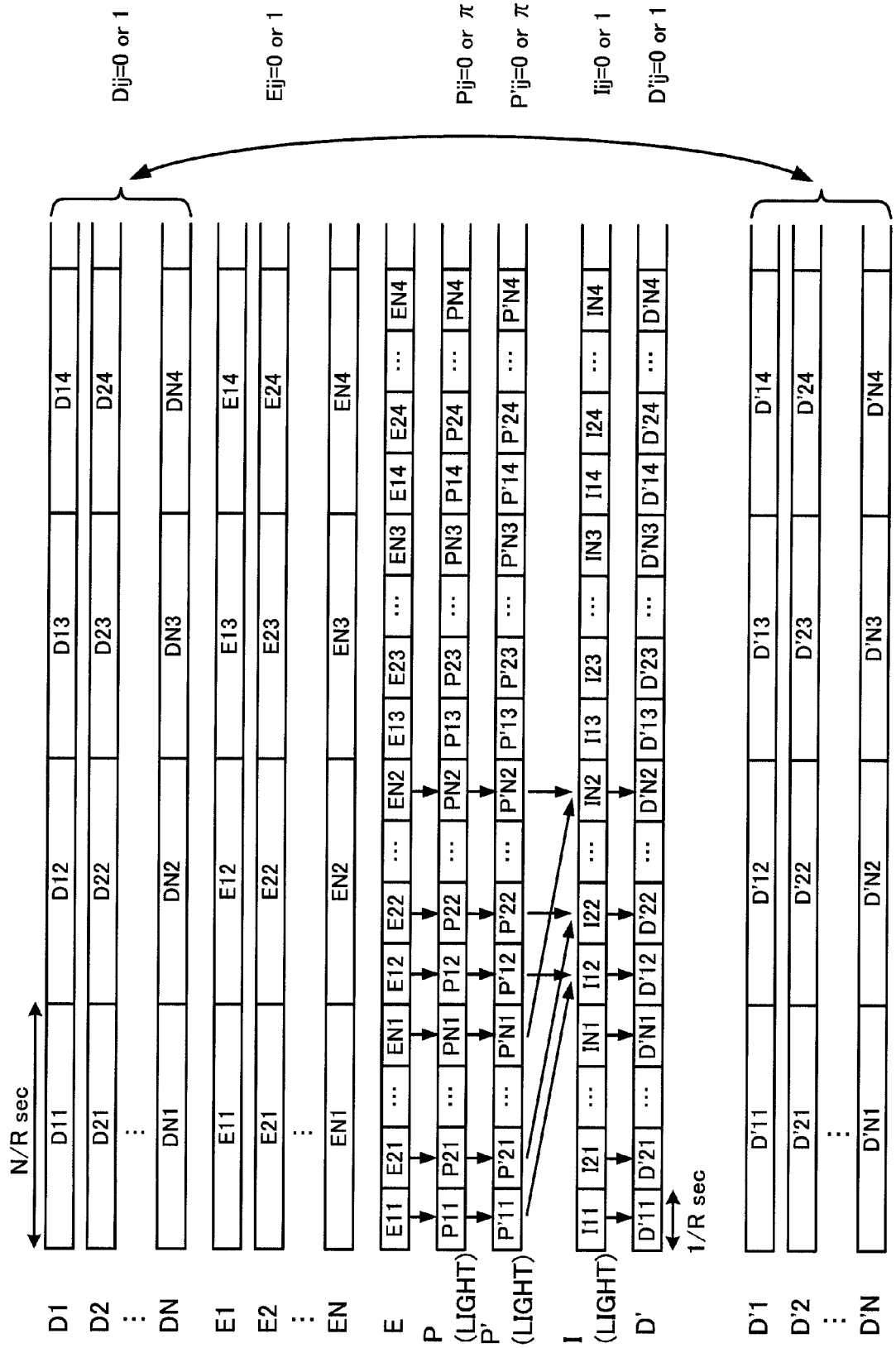
FIG. 3 is a timing chart showing operation of the first exemplary embodiment.

Next, operation of the first exemplary embodiment of the present invention will be described with reference to FIG. 1 to FIG. 3. When input of the respective input signals D1~DN is "1", the DPSK modulation coding units 115~117 invert the output signals E1~EN from a one-bit preceding output signal. As shown in FIG. 2, the input signals D1~DN are independently converted into DPSK modulation codes in N parallel (Step A1).

Next, the N:1 multiplexer 125 sequentially multiplexes the number N of the signals E1~EN coded for DPSK modulation bit by bit. In other words, the multiplexer executes time region multiplexing. Then, generate an Rbps serial signal (electric signal E) (Step A2). Thus, a manner of multiplexing bit by bit is shown in the timing chart of FIG. 3. More specifically, the number N of the signals E1~EN input in parallel are sequentially multiplexed bit by bit to generate the multiplexed electric signal E. As shown in FIG. 3, in the electric signal E being multiplexed, each DPSK modulation code generated at Step A1 appears at every N bits. In FIG. 3, Dij, Eij, Pij, P'ij and D'ij represent j-th signals (indicative of data) in signals Di (i=1, 2, ... N), Ei, Pi, P'i and D'I, respectively.

The Rbps serial signal (electric signal E) is input to the electric-phase modulation optical signal converter 127. The electric-phase modulation optical signal converter 127 converts the electric signal E into the optical signal P having phase information corresponding to the electric signal E, that is, a phase modulation optical signal, and outputs the obtained signal to the optical fiber (transmission path) 103 (Step A3). The optical fiber 103 transmits the phase modulation optical signal P output from the transmission device 101 to the reception device 102 (Step A4).

The optical signal P' transmitted over a long distance on the optical fiber 103 is input to the N-bit delay interferometer 132. The received signal is a DPSK modulation codes independent on an N-bit basis. Accordingly, the reception side compares a phase of the input optical signal and that of an N-bit preceding optical signal to execute DPSK demodulation and output the intensity modulation optical signal I (Step B1). Then, the intensity modulation optical signal I output from the N-bit delay interferometer 132 is input to the optical-electric signal converter 134, so that the optical-electric signal converter 134 converts the intensity modulation optical signal I into the electric signal D' (Step B2). The N:1 demultiplexer 136 divides the signal D' into N bit by bit to obtain D'1~D'N. In other words, time region demultiplexing is executed. The electric signals D'1~D'N correspond to the input signals D1~DN.

Effects of the present exemplary embodiment will be described. In the present exemplary embodiment, coding for DPSK modulation is executed in parallel at a rate 1/N a related method. Accordingly, since no high-speed operable coding unit is required, more cost-down can be realized than that of the related method. In addition, since signal connection at R/Nbps can be realized in compact design with ease, the device can be reduced in size.

While an arbitrary positive integer can be used as N, since too large the value of N is followed by too large the number of processings to be executed in parallel, the procedure will be only complicated. N is preferably a multiplier of 2 (2, 4, 8, 16, 32 . . . ) for the facility of structuring the high-speed N:1 multiplexer and 1:N demultiplexer.

Also in the present exemplary embodiment, use of coding units with an operation rate of 1/N arranged in the number of N in place of a coding unit operable at a super-high speed enables costs, size and power consumption to be reduced. When a speed is reduced by increasing N, costs, size and power consumption necessary for manufacturing one coding unit will have no difference at a speed below a certain speed. As a result, a problem of complication caused by increasing the number of parallelism will become graver. In addition, when coding is executed at a rate of 1/N, although the reception device 102 requires the N-bit delay interferometer 132, since an interferometer having a large N will have a long delay time, its manufacturing is difficult. Accordingly, assuming that a transmission rate on the optical fiber 103 is an operation rate of an advanced process, coding at ½ to ¹⁄₁₆ the rate enjoys the advantage of the present structure most. Since in the optical communication system, N in the conventionally used N:1 multiplexer 125 is 4 or 16, N is most preferably 4 or 16 in terms of affinity with existing systems.

Second Exemplary Embodiment

Next, a second exemplary embodiment of an optical communication system according to the present invention will be described with reference to the drawings.

Figure 4:
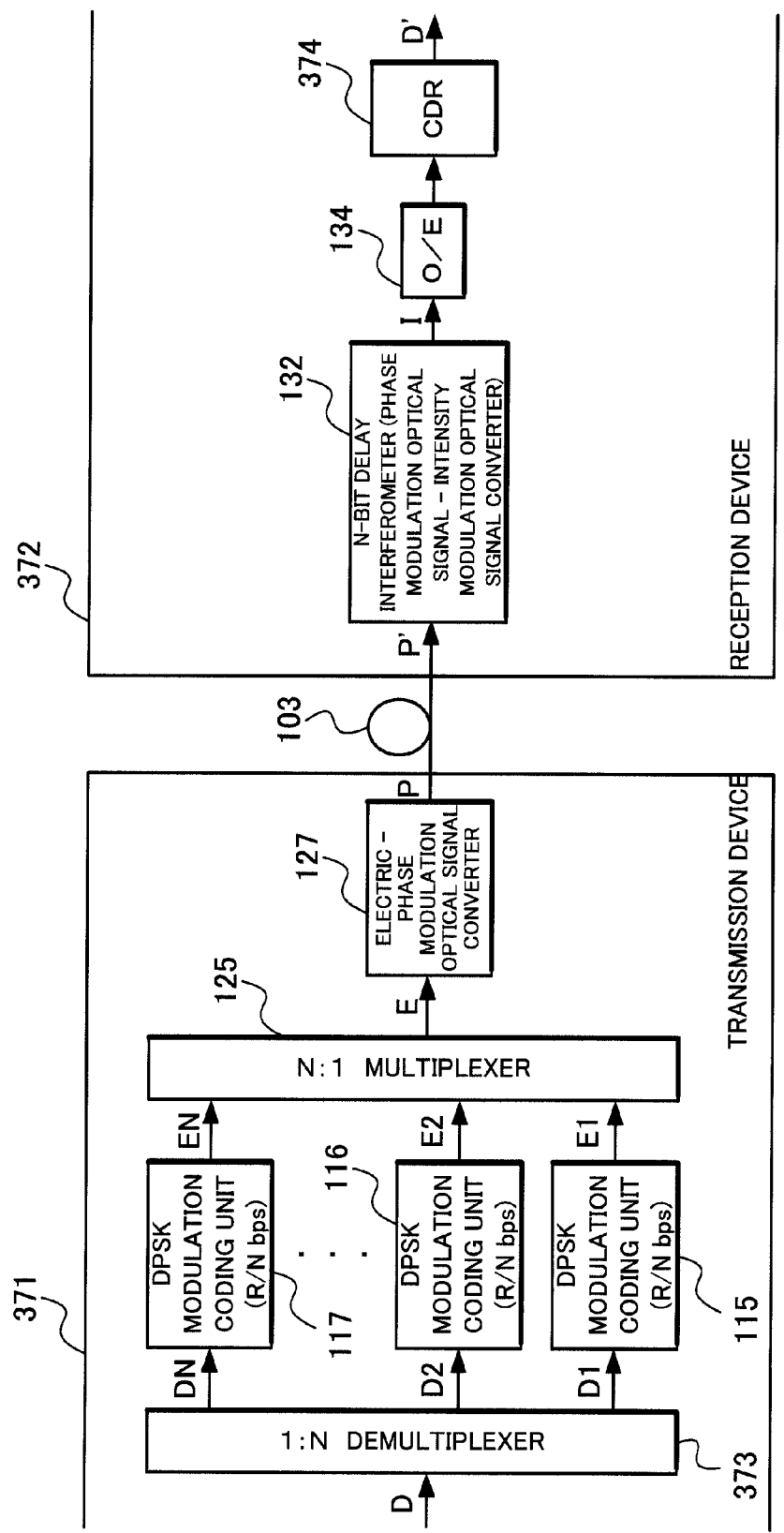
FIG. 4 is a block diagram showing a structure of a second exemplary embodiment according to the present invention.

FIG. 4 is a block diagram showing a second exemplary embodiment of an optical communication system according to the present invention. As shown in FIG. 4, the optical communication system according to the second exemplary embodiment differs from the first exemplary embodiment in that a signal rate of a signal source is Rbps and that of a signal decoded on the reception side is correspondingly Rbps.

In the present exemplary embodiment, at a transmission device 371, a signal D from a signal source is divided bit by bit by a 1:N demultiplexer 373 for dividing a signal into the number N of parallel signals bit by bit on time division basis to generate the number N of the parallel signals D1~DN. At a reception device 372, in place of the 1:N demultiplexer 136 shown in FIG. 1, a data reproducer (CDR) 374 operable at Rbps for identifying and reproducing an electric signal to reproduce an original signal is used to return a reception signal to the signal D' equivalent to the original signal D.

Figure 5:
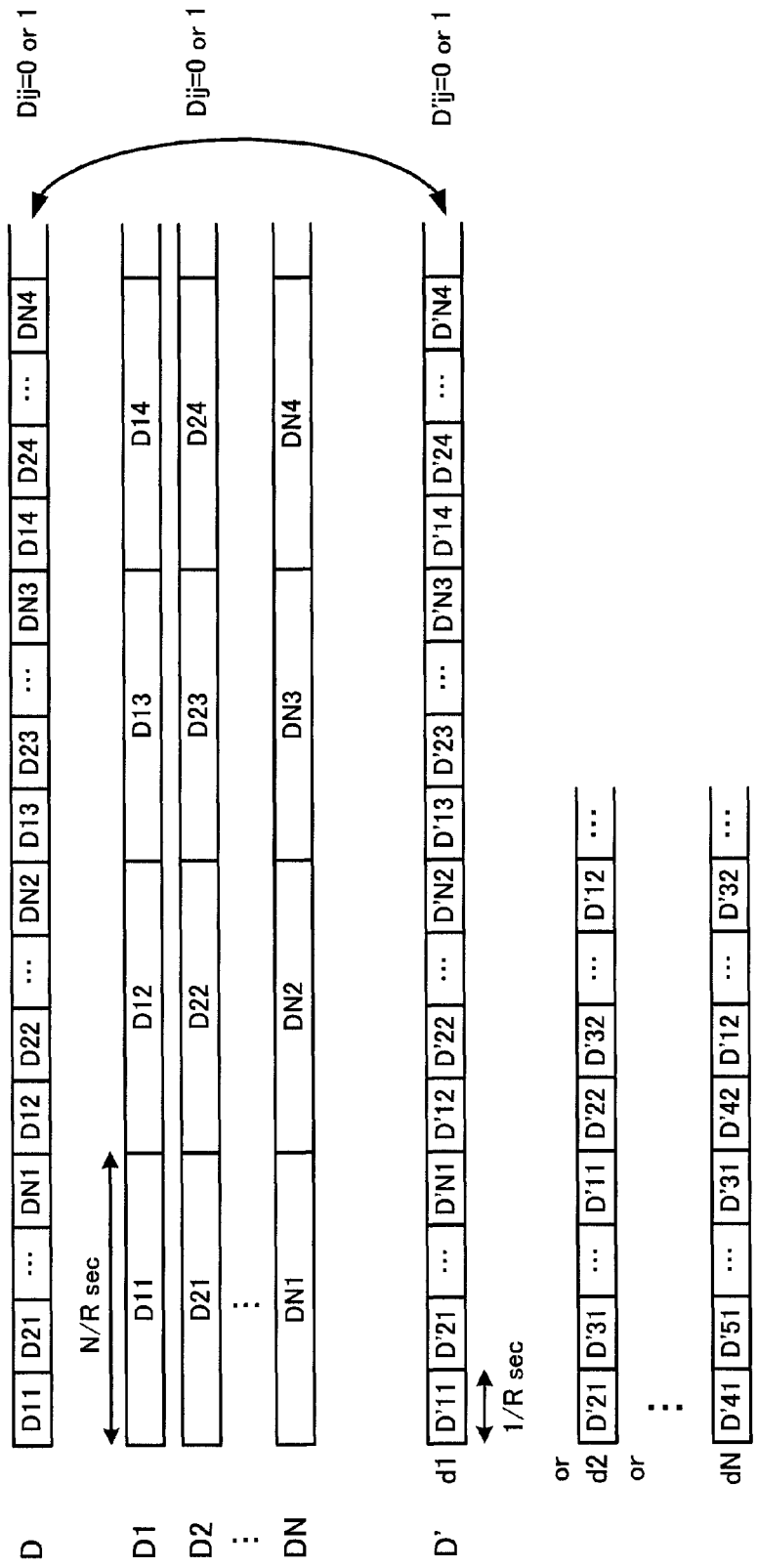
FIG. 5 is a timing chart showing operation of the second exemplary embodiment.

Possible alignment of the signals D' reproduced at the data reproducer 374 on the reception side has N patterns. This is because there are N patterns in which order the D1~DN appear in N output channels of the 1:N demultiplexer 373 on the transmission side. Also when the signal is multiplexed to a serial signal by the N:1 multiplexer 125, since possible alignment of the output signals E has N patterns, alignment of the output signals D' on the reception side has possibly N patterns. One example of the N patterns of alignment is indicated by d1~dN related to the signal D' shown in FIG. 5. For aligning the signal in the same pattern as that of the original signal D, arrangement should be changed by the signal processing at a succeeding stage.

Operation of the other components in the optical communication system is the same as that of the first exemplary embodiment. Effect obtained by the present exemplary embodiment is the same as that of the first exemplary embodiment.

First Example

Figure 6:
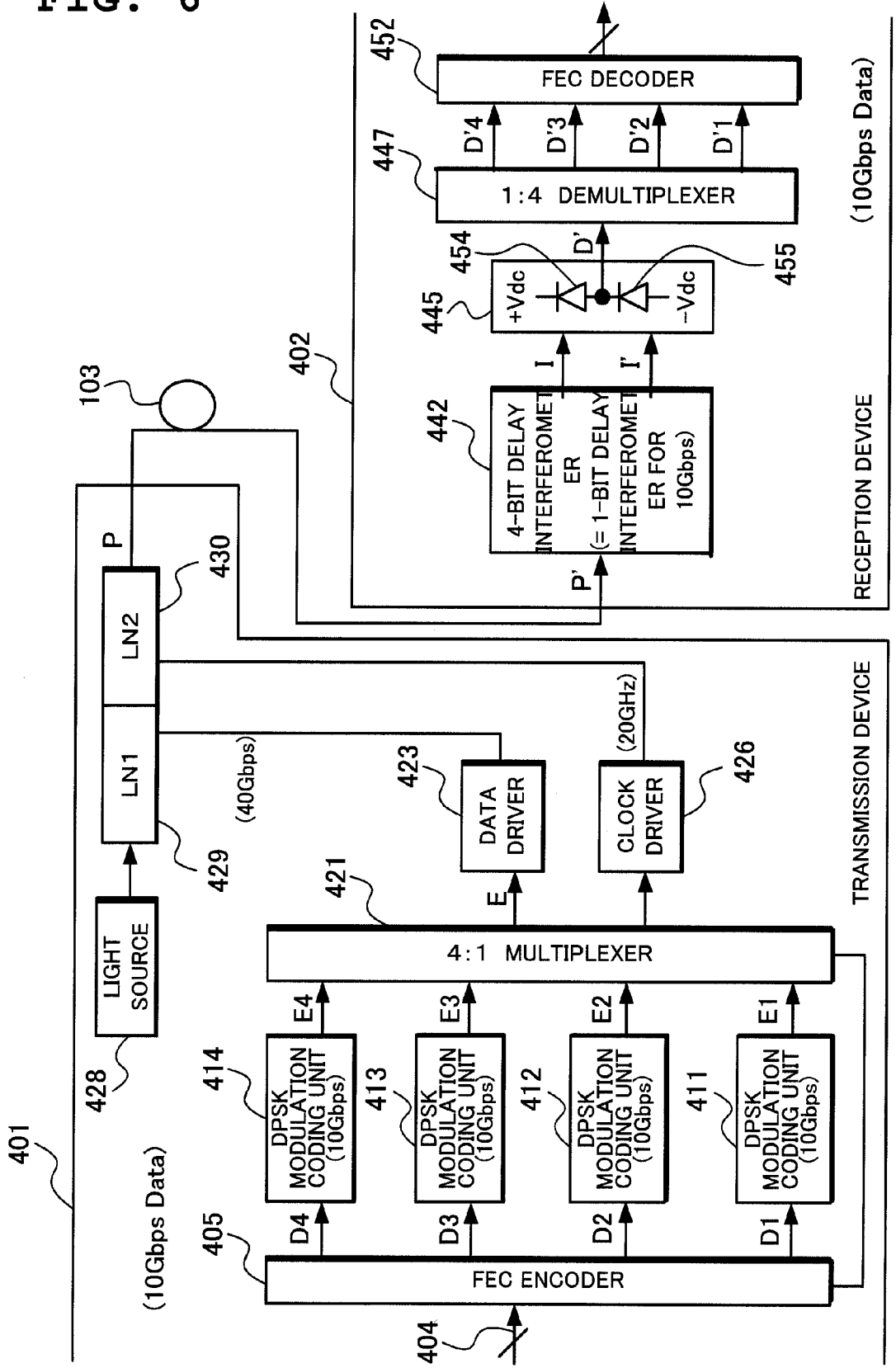
FIG. 6 is a block diagram showing a first example of the present invention.

Next, a first example of the present invention will be described with reference to FIG. 6 through FIG. 8, FIG. 9 and FIG. 10. FIG. 6 is a block diagram showing the first example of the present invention. The structure shown in FIG. 6 is equivalent to an example in which Rbps and N are specifically set to be 40 Gbps and 4, respectively, in the first exemplary embodiment shown in FIG. 1. As equivalency to a parallel input signal on the transmission side in the optical communication system shown in FIG. 1, four 10 Gbps signals D1~DN are applied in parallel from an FEC (Forward Error Correction) encoder 405 which receives input of an input signal 404.

A transmission device 401 comprises the FEC encoder 405, four DPSK modulation coding units 411~414, a 4:1 multiplexer 421, a light source (CW (Continuous Wave) light source) 428, LN (Litium Niobate) modulators 429 and 430, a data driver 423 and a clock driver 426. A reception device 402 comprises a 4-bit delay interferometer 442, a photo detector (PD) 445, a 1:4 demultiplexer 447 and an FEC decoder 452.

Figure 7:
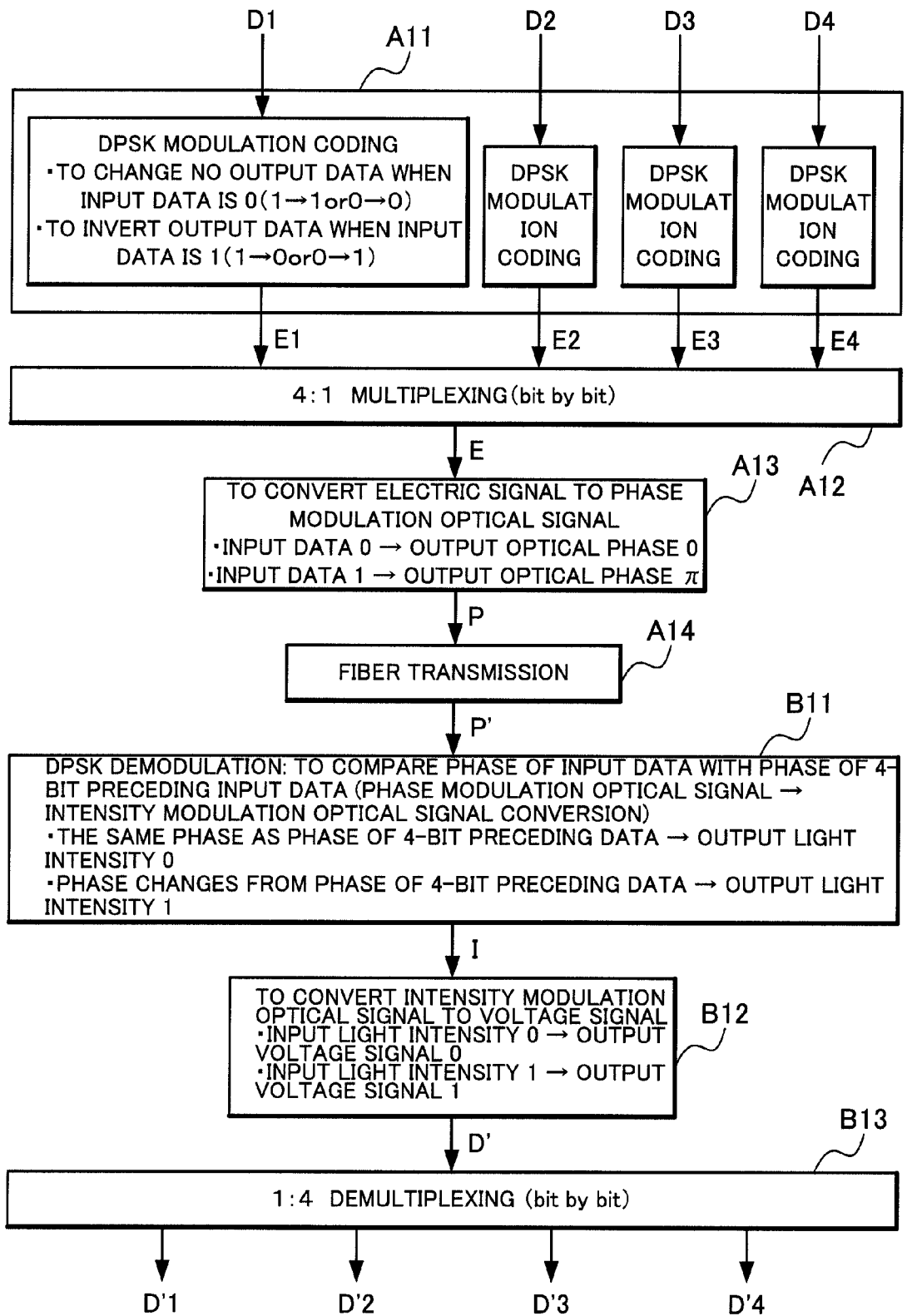
FIG. 7 is a flow chart for use in explaining the first example.
Figure 8:
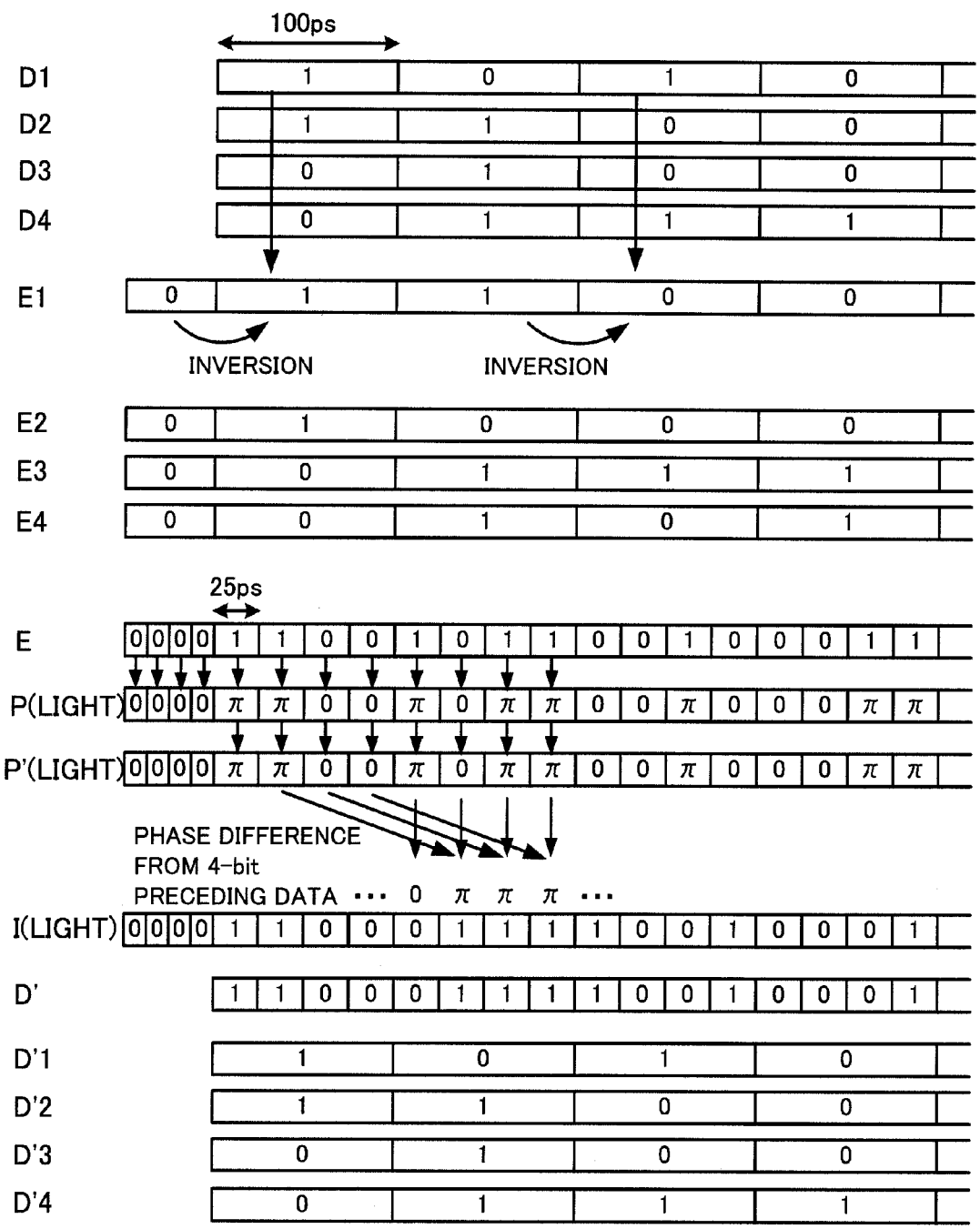
FIG. 8 is a timing chart for use in explaining the first example.

As shown in the flow chart of FIG. 7, the signals D1~D4 from the FEC encoder 405 are input to the four independent DPSK modulation coding units 411~414. The DPSK modulation coding units 411~414, when an input is "1", invert the output signals E1~E4 from a one-bit preceding output signal. As shown in FIG. 7, the input signals D1~D4 are converted into the signals E1~E4 of DPSK modulation codes (Step A11). How the signals are converted into the DPSK modulation codes is shown in the timing chart of FIG. 8.

The 4:1 multiplexer 421 multiplexes the signals E1~E4 bit by bit (Step A12). The data driver 423 amplifies the electric signal E as an output of the 4:1 multiplexer 421 to have an amplitude (approximately twice Vn of the LN modulator 429) necessary for the LN modulator 429 to modulate a phase.

The clock signal output from the FEC encoder 405 synchronizes with the four output signals D1~D4. The 4:1 multiplexer 421 is mounted with a clock multiplying function and the 4:1 multiplexer 421 multiplies the frequency of the clock signal to 20 GHz. The clock driver 426 amplifies the clock signal from the 4:1 multiplexer 421 to have a signal amplitude (approximately twice Vn of the LN modulator 430) necessary for the LN modulator 430 to execute RZ modulation.

The LN modulator 429 modulates a phase of a light output from the light source 428 by a voltage signal from the data driver 423 to output an optical signal whose phase is 0 or n. When a voltage signal input from the data driver 423 to the LN modulator 429 is at the high level, a phase of an output optical signal from the LN modulator 429 attains 0 (or π) and when a voltage signal input from the data driver 423 to the LN modulator 429 is at the low level, a phase of an output optical signal from the LN modulator 429 attains π (or 0).

The optical signal subjected to data modulation at the LN modulator 429 is further input to the LN modulator 430. The LN modulator 430 subjects the input light to clock modulation of an optical signal whose frequency is 40 GHz which is twice the frequency of a clock signal from the clock driver 426, converts obtained light into an RZ-DPSK modulation light having an RZ envelope and outputs the converted light.

Figure 9:
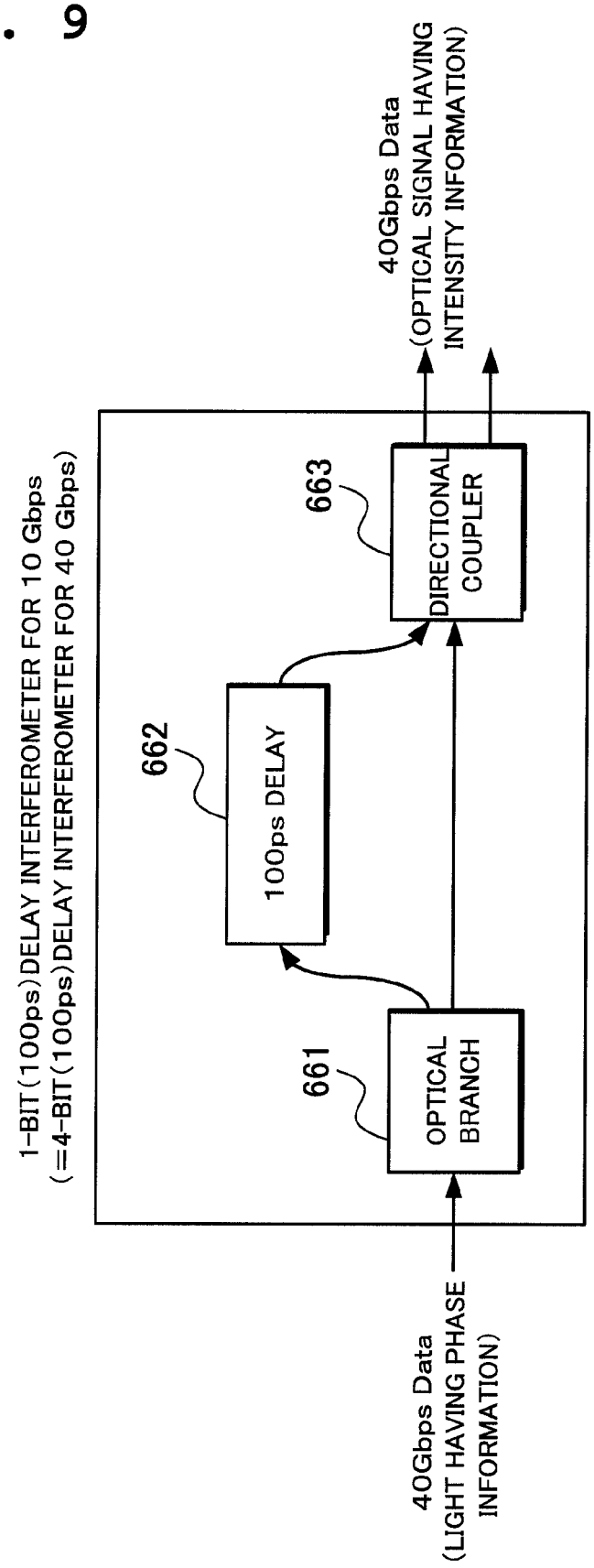
FIG. 9 is a block diagram showing a structure of a 4-bit delay interferometer for 40 Gbps used in the first example and a second example.

In the reception device 402, the 4-bit delay interferometer is such a Mach-Zehnder interferometer as shown in FIG. 9. More specifically, it includes an optical branch part 661 for branching an input light into two, a transmission path 662 for applying a time difference between two signals and a directional coupler 663 for interfering with two branched signals to convert them into light intensity signals. On the transmission path 662, there occurs a time difference before the two branched optical signals reach the interferometer 663 which is a time difference equivalent to four bits of a signal, that is, a 100 ps (picosecond) delay is generated. Since 100 ps is a time span for one bit of 10 Gbps signal, as the 4-bit delay interferometer 442, the same interferometer as the 10 Gbps 1-bit delay interferometer can be used.

In the 4-bit delay interferometer shown in FIG. 9, when a signal phase is the same as that of four-bit (more specifically, time for four bits) preceding signal, obtained from its output (one output of the directional coupler 663) is a signal with the output of the optical branch part 661 and the signal from the transmission path 662 enhanced. From the other output, obtained is a signal with the output from the optical branch part 661 and the signal from the transmission path 662 cancelled. Conversely, when the signal has a different phase, obtained from one output of the directional coupler 663 is a signal with the output from the optical branch part 661 and the signal from the transmission path 662 cancelled and obtained from other output is a signal with the output of the optical branch part 661 and the signal from the transmission path 662 enhanced.

Accordingly, when a phase difference between the input optical signal P' and a 4-bit preceding signal is n, the 4-bit delay interferometer 442 converts the input optical signal P' to have one optical signal I at the high level and the other optical signal I' at the low level and when the phase difference is 0, converts the same into reverse differential signals.

The optical differential signals I and I' output from the 4-bit delay interferometer 442 are input to the balanced PD 445. The optical signal I is input to a PD 454 and the I' is input to a PD 455. When the optical signal I is at the high level and the optical signal I' is at the low level, current flows into the PD 454 and no current follows into the PD 455. Accordingly, an electric signal D' by a voltage attains the high level. When the optical signal I is at the low level and the optical signal input I' is at the high level, no current flows into the PD 454 and current flows into the PD 455. Accordingly, the electric signal D' attains the low level. Thus, the optical differential signals I and I' are converted into voltage signals.

The electric signal D' output from the balanced PD 445 is input to the 1:4 demultiplexer 447 with a clock extraction function (CDR). The 1:4 demultiplexer 447 splits a 40 Gbps serial signal to the signals D'1~D'4 on a bit basis to output four 10 Gbps parallel signals D'1~D'4.

Figure 10:
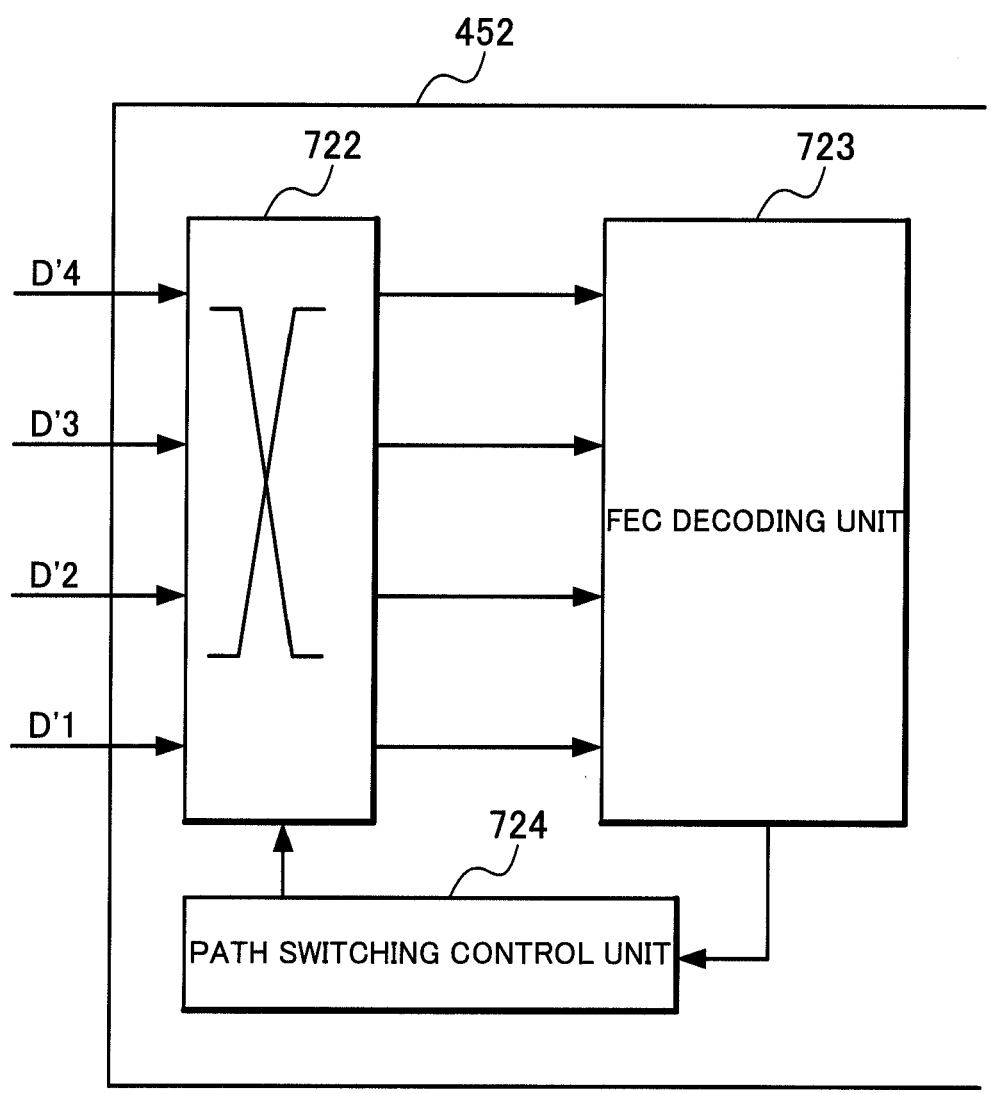
FIG. 10 is a block diagram showing a structure of an FEC decoder with a channel identification function which is used in the first example.

The four parallel signals D'~D'4 output from the 1:4 demultiplexer 447 correspond to the four signals D1~D4 output from the FEC encoder 405. As to in which of four output channels, the signals D'1~D'4 output from the 1:4 demultiplexer 447 appear, four patterns are possible as a probability of one-fourth. Accordingly, the FEC decoder 452 with a channel identification function is used as shown in FIG. 10. In the FEC decoder 452 shown in FIG. 10, a path switching switch 722 for switching a path is provided at an input stage. An FEC decoding unit 723 at a succeeding stage sends a monitored header or information of a channel identifier to a path switching control unit 724. The path switching control unit 724 switches a path of the path switching switch 722 based on the received information. Thus, the 4-channel signal input to the FEC decoding unit 723 is re-aligned into a desired data string.

The DPSK modulation coding units 411~414 can be structured in various forms by using a 1-bit delay unit and an exclusive OR circuit, or by using an AND circuit and a TFF (T-flip-flop) circuit. In the present invention, any structure can be used as a structure of the DPSK modulation coding units 411~414.

In the first example, although shown is a structure using RZ-DPSK as an optical modulation method, the structure is not limited thereto. Any modulation method in which an optical signal is mounted with phase information can be used such as CSRZ-DPSK or NRZ modulation of DPSK.

In addition, although shown is a case where a signal source on the transmission side is the FEC encoder 405, the signal source is not limited thereto. When an output interface speed of the signal source is low, possible is multiplexing to a rate of the coding unit. In a case, for example, where the output signals of the FEC encoder 405 are 625 Mbps×64, it is possible, after multiplexing them to 10 Gbps×4 by using four 16:1 multiplexers, to code the 10 Gbps signals and further multiplex the coded signals to 40 Gbps by the 4:1 multiplexer to execute 40 Gbps optical transmission.

Second Example

Figure 11:
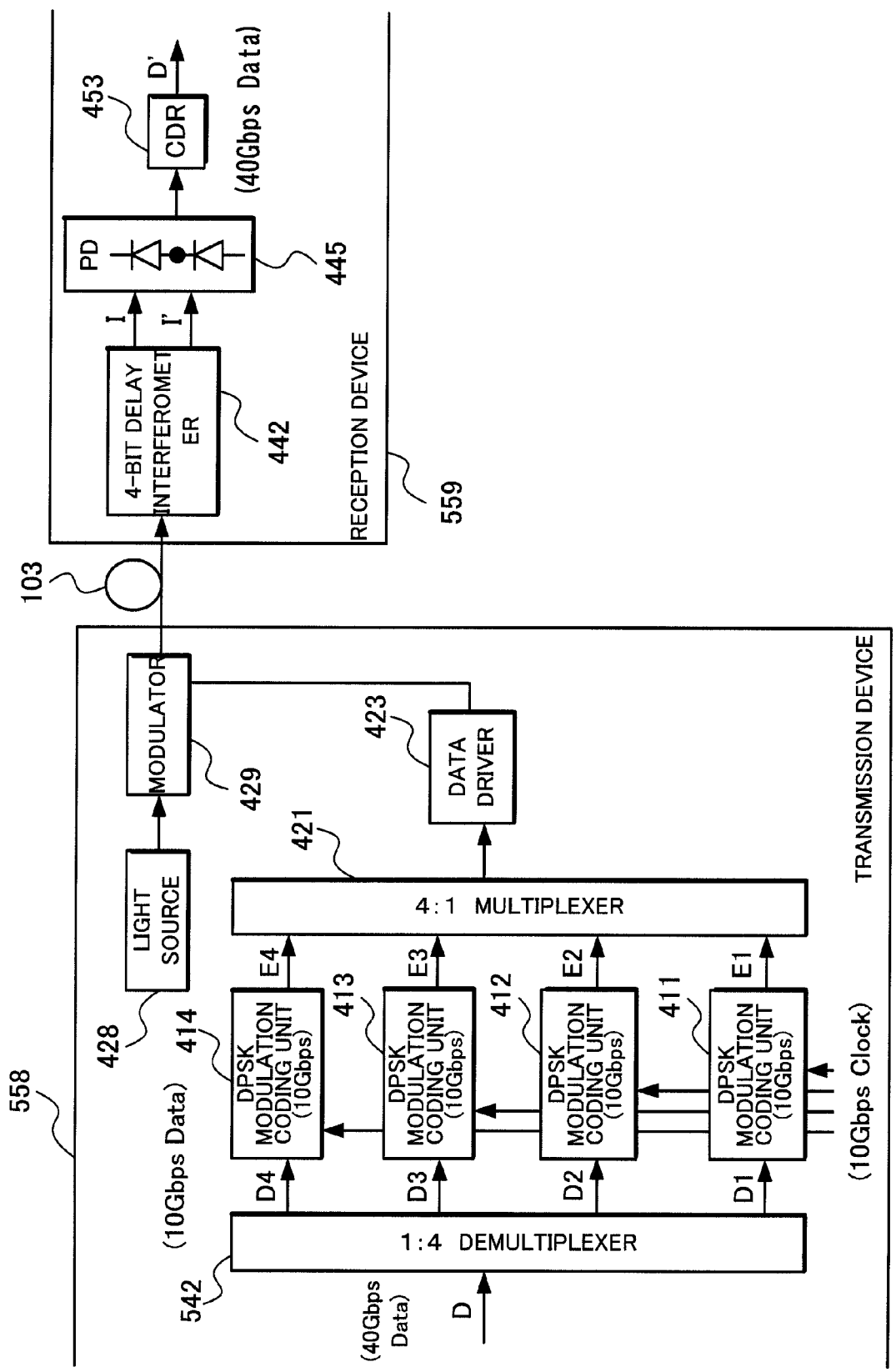
FIG. 11 is a block diagram showing the second example of the present invention.

Next, a second example of the present invention will be described with reference to FIG. 11. FIG. 11 is a block diagram showing the second example of the present invention. The second example corresponds to the second exemplary embodiment. The structure shown in FIG. 11 is equivalent to an example in which Rbps and N are specifically set to be 40 Gbps and 4, respectively, in the second exemplary embodiment shown in FIG. 4. The present example differs from the first example in that a signal from a signal source is a 40 Gbps serial signal and a signal restored at the reception side is also a 40 Gbps signal.

In a transmission device 558 shown in FIG. 11, used as the electric-phase modulation optical signal converter 127 at the transmission device 371 shown in FIG. 4 is the optical modulator 429 which modulates a phase of the light from the light source 428 by the data driver 423 which amplifies a signal from the 4:1 multiplexer 421. Used as the optical-electric signal converter 134 in the transmission device 371 shown in FIG. 4 is the balanced PD 445 similarly to the case of the first example. Used as the N-bit delay interferometer 132 is the 4-bit delay interferometer 442 similarly to the case of the first example.

In the present example, the signal D from the signal source is divided on a bit basis by a 1:4 demultiplexer 542 to generate the four parallel signals D1~D4. On the reception side, the signal is returned to the original signal by using a data reproducer (CDR) 453 operable at Rbps.

Applicable as a 100 ps delay method at the 4-bit delay interferometer 442 used in the first and second examples (see FIG. 9) are various methods including use of an optical fiber as the transmission path 662 and use of PLC (planer lightwave circuit). In the present invention, as a delay method at the delay interferometer, an arbitrary method can be used that enables conversion of information about a phase difference from a delayed signal into light intensity information.

Third Example

Figure 12:
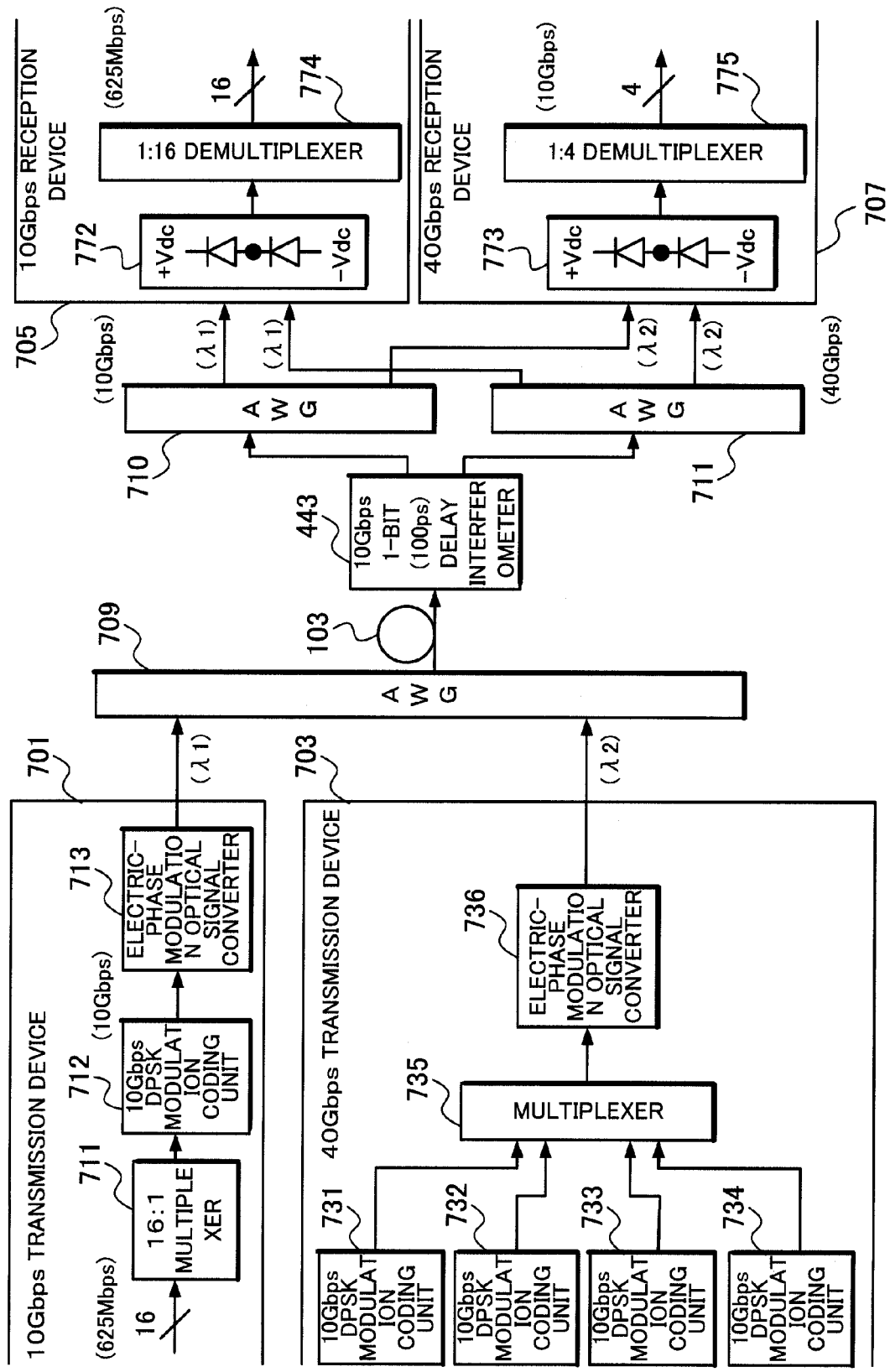
FIG. 12 is a block diagram showing a third example of the present invention.

Next, a third example of the present invention will be described with reference to FIG. 12. The present example is an example of a WDM optical communication system which wavelength-multiplexes a signal from a communication system using a 10 Gbps DPSK modulation method (a 10 Gbps transmission device 701) and a signal from a communication system using a 40 Gbps DPSK modulation method (a 40 Gbps transmission device 703) to send obtained signals on one optical fiber 103. In the structure shown in FIG. 12, at the time of DPSK demodulation on the reception side, one 10 Gbps 1-bit (loops) delay interferometer (hereinafter referred to as 1-bit delay interferometer) 443 is used without executing demodulation on a wavelength basis. In other words, after demodulating two optical signals of different wavelengths in the lump, wavelength division is executed. Since for wavelengths $\lambda 1$ and $\lambda 2$ of the two wavelength signals, the common 10 Gbps 1-bit delay interferometer 443 can be used, it is unnecessary to prepare a delay interferometer for each reception device.

The WDM optical communication system according to the present example includes the transmission device 701 as a second phase modulation optical signal sending unit for sending a 10 Gbps signal with the wavelength $\lambda 1$, the transmission device 703 as a first phase modulation optical signal sending unit for sending a 40 Gbps signal with the wavelength of $\lambda 2$, an AWG (arrayed waveguide) 709 for wavelength-multiplexing these signals of the two wavelengths, the optical fiber (single mode fiber for transmitting an optical signal) 103, the 10 Gbps 1-bit delay interferometer 443, AWG 710 and 711 for executing wavelength separation, a 10 Gbps reception device 705 and a 40 Gbps reception device 707.

The 10 Gbps transmission device 701 includes a 10 Gbps DPSK modulation coding unit 712 and an electric-phase modulation optical signal converter 713 for converting an electric signal coded by a DPSK modulation coding unit 712 into a phase modulation optical signal. The 40 Gbps transmission device 703 is a 40 Gbps transmission device having such four 10 Gbps DPSK modulation coding units 731~734 as shown in the first example and the second example (the DPSK modulation coding units 411~414 in the first example and the second example), a multiplexer 735 for multiplexing a parallel signal coded by the DPSK modulation coding units 731~734 bit by bit on a time division basis to generate an Rbps signal and an electric-phase modulation optical signal converter 736. In the example shown in FIG. 12, the transmission device 701 is provided with a 16:1 multiplexer 711 for multiplexing 16 signals of 625 Mpbs. Also the reception device 705 is provided with a 1:16 demultiplexer 774 for separating a 10 Mbps serial signal into 16 signals.

On the reception side, the optical signal transmitted through the optical fiber 103 is input to the 10 Gbps 1-bit delay interferometer 443. The 1-bit delay interferometer 443 compares phases of two wavelength optical signals in the lump with a phase of a 100 ps—preceding signal. Accordingly, as to a 10 Gbps signal with the wavelength $\lambda 1$, phase comparison is made with a one-bit (more specifically, a time period equivalent to one bit) preceding signal and as to a 40 Gbps signal with the wavelength $\lambda 2$, phase comparison is made with a four-bit (more specifically, a time period equivalent to four bits) preceding signal. The 1-bit delay interferometer 443 outputs differential intensity modulation optical signals based on these comparison results.

Since the output differential intensity modulation optical signals include wavelength elements of $\lambda 1$ and $\lambda 2$, respectively, they are input to the AWG 710 and 711 which separate an optical signal into intensity modulation optical signals of the respective wavelengths and separated into an intensity modulation optical signal with the wavelength $\lambda 1$ and an intensity modulation optical signal with the wavelength $\lambda 2$, respectively, and output. The respective outputs from the AWG 710 and 711 are input to the reception devices 705 and 707 as a pair of differential signals with the same wavelength and processed. Here, for maintaining differential information in the output from the 1-bit delay interferometer 443, transmission path characteristics (loss or delay time characteristics) of a signal path of the signal with the wavelength $\lambda 1$ input to the reception device 705 from the 1-bit delay interferometer 443 through the AWG 710 and transmission path characteristics of a signal path of the signal with the wavelength $\lambda 1$ input to the reception device 705 from the 1-bit delay interferometer 443 through the AWG 711 should be equal. Similarly, two signal paths of signals with the wavelength $\lambda 2$ should have the same transmission patch characteristics.

The intensity modulation optical signal with the wavelength $\lambda 1$ separated by the AWG 710 or 711 is converted into an electric signal by a PD 772 of the reception device 705. The intensity modulation optical signal with the wavelength $\lambda 2$ separated by the AWG 710 or 711 is converted into an electric signal by an PD 773 of the reception device 707 and then returned to four original signals by a 1:4 demultiplexer 775.

Fourth Example

Figure 13:
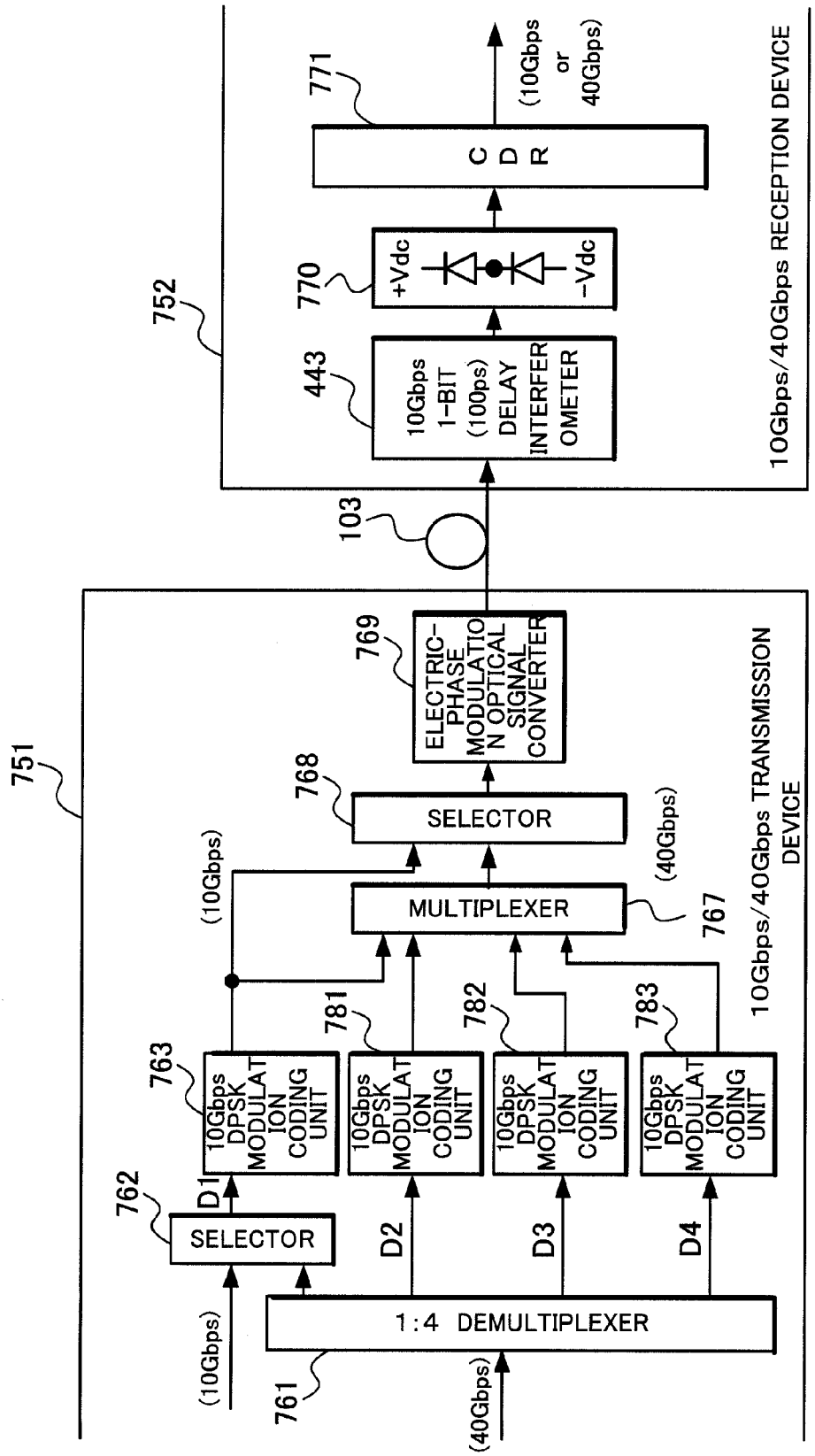
FIG. 13 is a block diagram showing a fourth example of the present invention.
Figure 14:
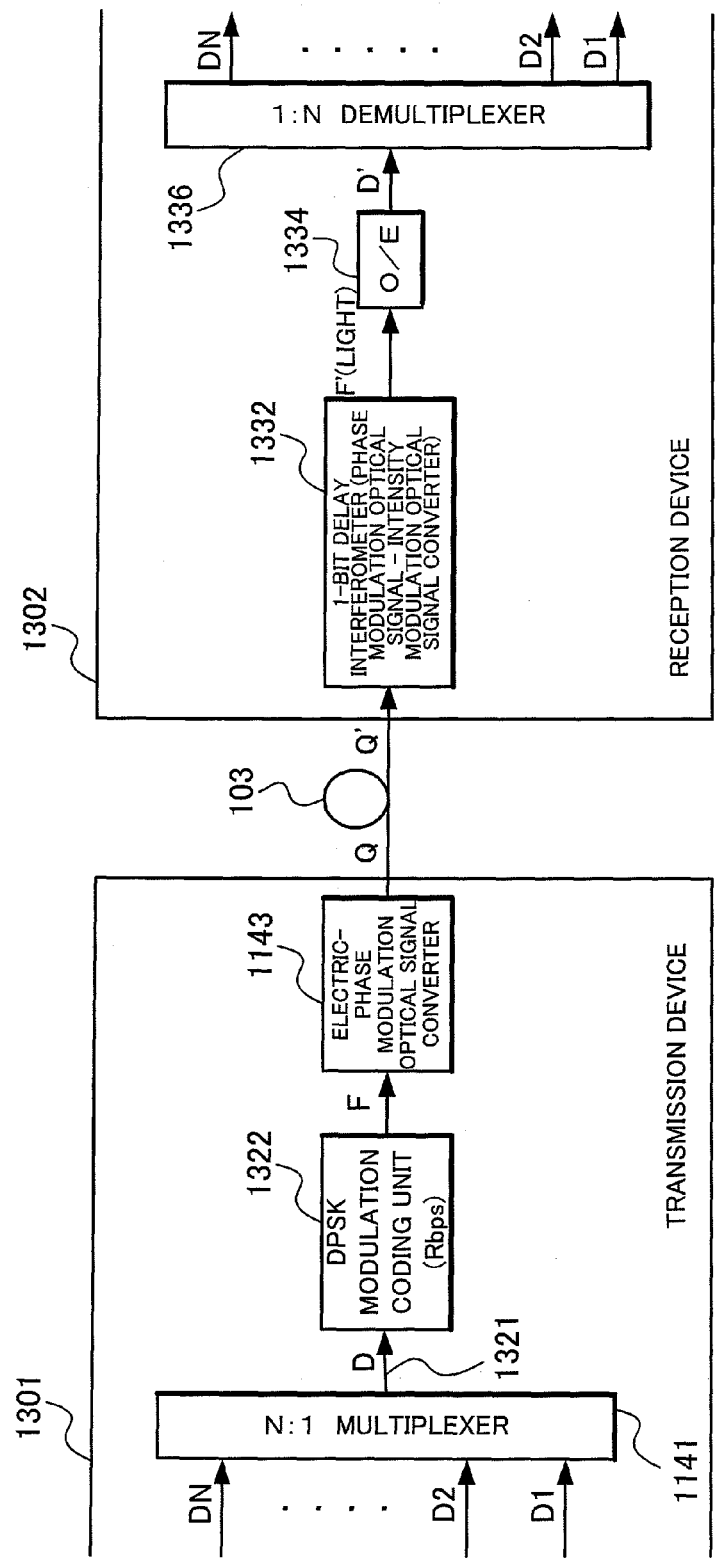
FIG. 14 is a block diagram showing a structure of a common optical communication system.
Figure 15:
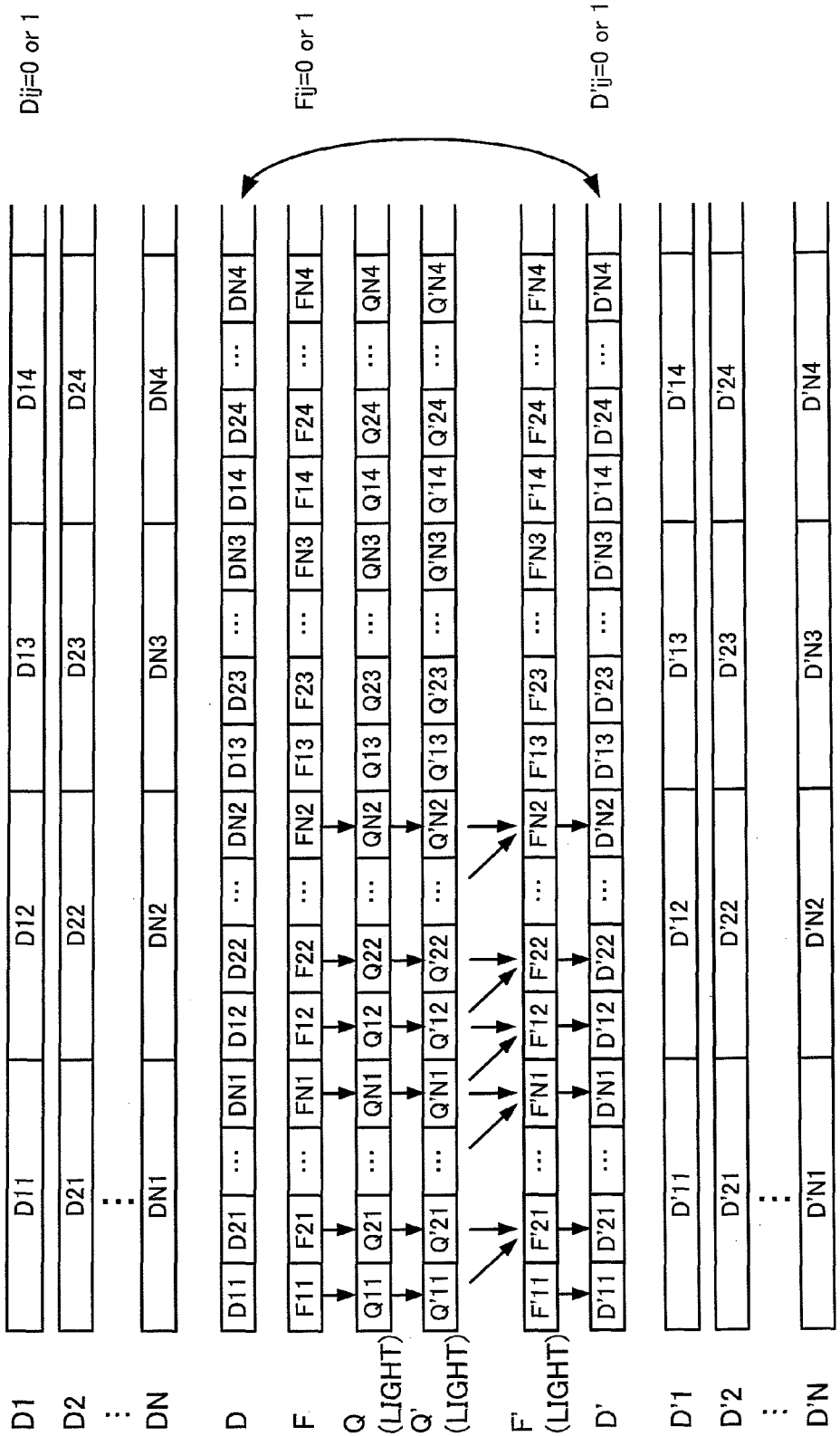
FIG. 15 is a timing chart showing operation of a common optical communication system.

Next, a fourth example of the present invention will be described with reference to FIG. 13. In the present example, a transmission device 751 is designed to enable all DPSK modulation coding units 763, 781, 782 and 783 to share an electric-phase modulation optical signal converter 769, thereby enabling output of either of a 10 Gbps signal and a 40 Gbps signal. In addition, by using a multi-rate CDR 771 as a CDR for identifying and reproducing an electric signal to reproduce an original signal, a reception device 752 is allowed to receive either of a 10 Gbps signal and a 40 Gbps signal.

The transmission device 751 receives input of a 10 Gbps electric signal (voltage signal) or a 40 Gbps electric signal. When receiving input of a 10 Gbps signal, a selector 762 is set to output the signal. A selector 768 is also set to select a signal from the DPSK modulation coding unit 763. Such setting enables a signal from a 10 Gbps signal source to be converted by the electric-phase modulation optical signal converter 769 and output as a DPSK modulation light to the optical fiber 103.

When receiving input of a 40 Gbps signal, first, a 1:4 demultiplexer 761 divides the signal into four 10 Gbps signals. The selectors 762 is set to select an output signal from the 1:4 demultiplexer 761. Furthermore, the selector 768 is set to select a 40 Gbps signal which is an output from a multiplexer 767 which generates a serial signal by multiplexing on a time division basis. Such setting enables a signal from a 40 Gbps signal source to be converted by the electric-phase modulation optical signal converter 769 and output as a DPSK modulation light to the optical fiber 103. Thus, in the present example, the transmission device 751 has a function of transmitting a DPSK phase modulation optical signal with any of a 10 Gbps signal and a 40 Gbps signal as input.

The reception device 752 includes the 10 Gbps 1-bit delay interferometer 443, a balanced PD 770 as an optical-electric signal converter and the multi-rate CDR 771. The 1-bit delay interferometer 443 is capable of decoding any of 10 Gbps and 40 Gbps DPSK modulation signals generated at the transmission device 558 shown in FIG. 11, the transmission devices 701 and 703 shown in FIG. 12 and the transmission device 751 shown in FIG. 13. Here, the PD 770 is a device for a wide-band base band signal for 40 Gbps, which is capable of receiving a 10 Gbps signal as well. Used as the multi-rate CDR 771 is one compatible with either speed of 10 Gbps and 40 Gbps. The foregoing described structure enables the reception device 752 to receive either of a 10 Gbps DPSK modulation light and a 40 Gbps DPSK modulation light to reproduce an original signal.

Thus described structure enables the present invention to realize an optical communication system using DPSK modulation without the need of a coding unit operable at a super-high speed.

Furthermore, decoding can be executed only by the use of a number N of coding units on a transmission side and only one N-bit delay interferometer, for example, on a reception side. Adopting such a structure attains the objects of the present invention.

First effect of the exemplary embodiments according to the present invention is to reduce costs of super-high speed optical communication device and optical communication system using DPSK modulation-demodulation. The reason is that a coding unit operable at a super-high speed will be unnecessary for coding for DPSK modulation and only the use of a coding unit whose rate is 1/N is necessary. Since such a coding unit with a rate of 1/N can be manufactured by using a process whose cost is less than that of a coding unit operable at a super-high speed, costs of an optical communication device and an optical communication system using the coding unit can be reduced.

In addition, an Rbps decoding unit required in a reception device is for interfering with one of optical paths within an interferometer by the delay of 1/R×N bits=N/Rsec (second). Since N/Rsec is equal to one bit delay time of R/Nbps, a 1-bit delay interferometer for a rate of 1/N can be used without modification. Accordingly, because for both the coding unit and the decoding unit for DPSK, a device common to that developed for a system with 1/N rate can be used, the market to which these devices are applicable can be expanded to expect cost-down by mass-production effects. As a result, cost-down of an optical communication device and a communication system using these devices is expected.

Common use of both the coding unit and the decoding unit for DPSK also for a system with a 1/N rate enables a multi-rate optical communication device which is operable also at 1/N to be structured at low costs.

In addition, since in a WDM optical communication system, a decoding unit can be shared with a 1/N system whose wavelength is close, the system can be smoothly upgraded from the rate of 1/N to expect cost-down of the system as a whole.

Second effect is reduction in power consumption of super-high speed optical communication device and optical communication system using DPSK modulation. The reason is that the coding unit with an operation rate of 1/N used in the present invention consumes drastically less power than that of a super-high speed coding unit required in a related structure.

The super-high speed coding unit required in a related structure is manufactured by using an advanced high-speed semiconductor process. Since such a super-high speed device is designed to have high power supply voltage and flow a large amount of current in order to bring out maximum performance of a transistor, its power consumption is large. By reducing an operation rate of the device from a rate requiring an advanced semiconductor process to 1/N, the present invention enables the coding unit to be manufactured by using a lower power consumption process which can be driven by low voltage and small current. In addition, even when manufactured by using the same process as that of a super-high speed device, optimization to a rate of 1/N enables designing which decreases a current to be flown through a transistor, so that drastic reduction in power consumption is expected.

Third effect is provision of stable and highly reliable optical communication device and optical communication system for DPSK modulation. The reason is that the number of super-high speed devices liable to ESD (electrostatic discharge) can be reduced. Many of super-high speed devices should have circuit architecture liable to ESD in order to fully exhibit its high speed performance. Reduction in the number of super-high speed operation parts liable to ESD leads to reduction in errors and improvement in the yield of the devices.

Fourth effect is provision of small-sized optical communication device and optical communication system for DPSK modulati6on. The reason is that connecting an input/output signal of the coding unit at a rate of 1/N is suitable for using a compact connection method as compared with connection of a super-high speed signal as it is. Reducing a rate of the signal to 1/N enables use of not a coaxial connector compatible with a super-high speed signal but surface packaging BGA (ball grid array) and the like for an input/output part of the signal. Accordingly, space for a connector will be unnecessary in a package to enable down-sizing of a package size of the coding unit.

Furthermore, since it is also possible to connect input/output signal by using wiring on a substrate, space necessary for layout of a connector can be reduced to enable more dense arrangement.

Moreover, integration of a coding function with other pre-processing function IC such as FEC IC will be facilitated to make further down-sizing by integration be expected.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INCORPORATION BY REFERENCE

This application is based upon and claims the benefit of priority from Japanese patent application No. 2005-188807, filed on Jun. 28, 2005, the disclosure of which is incorporated herein in its entirety by reference.

The invention claimed is:
1. An optical communication device for use in an optical communication system which uses a DPSK modulation-demodulation method, comprising:
 a number N (N: positive integer) of coding units for executing DPSK modulation coding with respect to the number N of input electric signals in N parallel, a multiplexing unit for multiplexing a parallel signal coded by said coding unit bit by bit on a time division basis to generate a serial signal, an electric-phase modulation optical signal conversion unit for converting a serial signal generated by said multiplexing unit into a phase modulation optical signal, a decoding unit for executing DPSK decoding of said phase modulation optical signal by comparison with an N-bit preceding optical signal, an optical-electric signal conversion unit for converting an intensity modulation optical signal decoded by said decoding unit into an electric signal, and a division unit for dividing an electric signal converted by said optical-electric signal conversion unit into the number N of signals bit by bit on a time division basis.

2. The optical communication device according to claim 1, wherein said decoding unit is a Mach-Zehnder type N-bit delay interferometer.

3. The optical communication device according to claim 2, wherein said Mach-Zehnder type N-bit delay interferometer is a 1-bit delay interferometer.

4. The optical communication device according to claim 1, wherein said integer N is 2, 4, 8 or 16.

5. An optical communication device for use in a WDM optical communication system which uses a DPSK modulation-demodulation method, comprising:

a first phase modulation optical signal sending unit for sending an Rbps phase modulation optical signal, a second phase modulation optical signal sending unit for sending an R/N bps (N: positive integer) phase modulation optical signal in a wavelength different from a wavelength of said Rbps phase modulation optical signal, a multiplexing unit for multiplexing optical signals of two wavelengths on one optical fiber, a decoding unit for executing DPSK decoding in a lump with respect to optical signals of two wavelengths having been transmitted through the optical fiber by comparison with an N-bit preceding optical signal, a separation unit for separating an optical signal decoded by said decoding unit into a plurality of intensity modulation optical signals of the respective wavelengths, and an optical-electric signal conversion unit for converting an intensity modulation optical signal of each wavelength separated by said separation unit into an electric signal, wherein said first phase modulation optical signal sending unit includes a number N of coding units for executing DPSK modulation coding with respect to the number N of input electric signals in N parallel at a rate of R/Nbps, and a multiplexing unit for multiplexing a parallel signal coded by the coding unit bit by bit on a time division basis to generate an Rbps signal, and said second phase modulation optical signal sending unit includes a coding unit for executing DPSK modulation coding at a rate of R/Nbps.

6. The optical communication device according to claim 5, wherein said decoding unit is a Mach-Zehnder type N-bit delay interferometer.

7. The optical communication device according to claim 5, wherein said integer N is 2, 4, 8 or 16.

8. An optical communication system using a DPSK modulation-demodulation method, comprising:

a transmission device having a number N (N: positive integer) of coding units for executing DPSK modulation coding with respect to the number N of input electric signals in N parallel, a multiplexing unit for multiplexing a parallel signal coded by said coding unit bit by bit on a time division basis to generate a serial signal, and an electric-phase modulation optical signal conversion unit for converting a serial signal generated by said multiplexing unit into a phase modulation optical signal, a sending unit for sending said phase modulation optical signal, and a reception unit having a decoding unit for executing DPSK decoding with respect to a phase modulation optical signal transmitted by said sending unit by comparison with an N-bit preceding optical signal, an optical-electric signal conversion unit for converting an intensity modulation optical signal decoded by said decoding unit into an electric signal, and a division unit for dividing an electric signal converted by said optical-electric signal conversion unit into the number N of signals bit by bit on a time division basis.

9. The optical communication system according to claim 8, wherein said decoding unit is a Mach-Zehnder type N-bit delay interferometer.

10. The optical communication system according to claim 8, wherein said integer N is 2, 4, 8 or 16.

11. An optical communication system in a WDM optical communication system which uses a DPSK modulation-demodulation method, comprising:

a transmission device having a first phase modulation optical signal sending unit for sending an Rbps phase modulation optical signal, a second phase modulation optical signal sending unit for sending an R/N bps (N: positive integer) phase modulation optical signal in a wavelength different from a wavelength of said Rbps phase modulation optical signal, and a multiplexing unit for multiplexing optical signals of two wavelengths, a sending unit for sending an optical signal multiplexed by said multiplexing unit, and a reception device having a decoding unit for executing DPSK decoding in a lump with respect to optical signals of two wavelengths having been sent by said sending unit by comparison with an N-bit preceding optical signal, a separation unit for separating an optical signal decoded by said decoding unit into intensity modulation optical signals of the respective wavelengths, and an optical-electric signal conversion unit for converting an intensity modulation optical signal of each wavelength separated by said separation unit into an electric signal, wherein said first phase modulation optical signal sending unit includes a coding unit for executing DPSK modulation coding with respect to the number of N of input electric signals in N parallel at a rate of R/Nbps by the number N of coding units, and a multiplexing unit for multiplexing a parallel signal coded by said coding unit bit by bit on a time division basis to generate an Rbps signal, and said second phase modulation optical signal sending unit includes a coding unit for executing DPSK modulation coding at a rate of R/Nbps.

12. The optical communication system according to claim 11, wherein said decoding unit is a Mach-Zehnder type N-bit delay interferometer.

13. The optical communication system according to claim 11, wherein said integer N is 2, 4, 8 or 16.

14. A DPSK modulation-demodulation method, comprising:

executing DPSK modulation coding with respect to a number N (N: positive integer) of input electric signals in N parallel by the number N of coding units, multiplexing a coded parallel signal bit by bit on a time division basis to generate a serial signal, converting a generated serial signal into a phase modulation optical signal, sending a phase modulation optical signal, executing DPSK decoding with respect to a sent phase modulation optical signal by comparison with an N-bit preceding optical signal, converting a decoded intensity modulation optical signal into an electric signal, and dividing a converted electric signal into the number N of signals bit by bit on a time division basis.

15. The DPSK modulation-demodulation method according to claim 14, wherein at the time of DPSK-decoding, a Mach-Zehnder type N-bit delay interferometer is used.

16. The DPSK modulation-demodulation method according to claim 14, wherein said integer N is 2, 4, 8 or 16.

17. A DPSK modulation-demodulation method in a WDM optical communication system, comprising:

sending an Rbps phase modulation optical signal and an R/N bps (N: positive integer) phase modulation optical signal of a wavelength different from a wavelength of said Rbps phase modulation optical signal, multiplexing optical signals of two wavelengths, sending a multiplexed optical signal, executing DPSK decoding in a lump with respect to optical signals of two wavelengths having been sent by comparison with an N-bit preceding optical signal, separating a decoded optical signal into intensity modulation optical signals of the respective wavelengths, and converting a separated intensity modulation optical signal of each wavelength into an electric signal, wherein at the time of sending an Rbps phase modulation optical signal, DPSK modulation coding is executed with respect to the number N of input electric signals in N parallel at a rate of R/Nbps by the number N of coding units, and a parallel signal coded is multiplexed bit by bit on a time division basis, and at the time of sending an R/N bps phase modulation optical signal, DPSK modulation coding is executed at a rate of R/N bps to convert a coded signal into a phase modulation optical signal.

18. The DPSK modulation-demodulation method according to claim 17, wherein at the time of DPSK-decoding, a Mach-Zehnder type N-bit delay interferometer is used.

19. The DPSK modulation-demodulation method according to claim 17, wherein said integer N is 2, 4, 8 or 16.

* * * * *

UNITED STATES PATENT AND TRADEMARK OFFICE
CERTIFICATE OF CORRECTION

PATENT NO. : 8,639,114 B2
APPLICATION NO. : 11/916612
DATED : January 28, 2014
INVENTOR(S) : Satomi Shioiri et al.

Page 1 of 1

It is certified that error appears in the above-identified patent and that said Letters Patent is hereby corrected as shown below:

Title Page, item (30), above PRIOR PUBLICATION DATA, insert

--FOREIGN PRIORITY DATA

Japanese Patent Application No. 2005-188807 filed on 06/28/2005--

In the Specification

Column 8, Line 1: Delete "D'~D'4" and insert --D'1~D'4--

Signed and Sealed this
Sixteenth Day of December, 2014

Michelle K. Lee
*Deputy Director of the United States Patent and Trademark Office*